United States Patent
Su et al.

(10) Patent No.: US 7,707,526 B2
(45) Date of Patent: Apr. 27, 2010

(54) PREDICTING IC MANUFACTURING YIELD BASED ON HOTSPOTS

(75) Inventors: Qing Su, Sunnyvale, CA (US); Charles C. Chiang, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 306 days.

(21) Appl. No.: 11/805,916

(22) Filed: May 25, 2007

(65) Prior Publication Data
US 2008/0295046 A1     Nov. 27, 2008

(51) Int. Cl.
*G06F 17/50*     (2006.01)
(52) U.S. Cl. ............. 716/4; 716/5; 716/19; 716/20; 716/21
(58) Field of Classification Search ............. 716/4–5, 716/19–21
See application file for complete search history.

(56) References Cited

U.S. PATENT DOCUMENTS

| | | | |
|---|---|---|---|
| 7,448,012 B1 * | 11/2008 | Qian | 716/11 |
| 2005/0132322 A1 * | 6/2005 | Inoue | 716/19 |
| 2007/0044049 A1 * | 2/2007 | Adams et al. | 716/4 |

* cited by examiner

*Primary Examiner*—Vuthe Siek
(74) *Attorney, Agent, or Firm*—Park, Vaughan & Fleming LLP (57) ABSTRACT

One embodiment of the present invention provides a system that predicts a manufacturing yield of a chip. During operation, the system first receives a chip layout. Next, the system identifies hotspots within the chip layout, wherein a hotspot is a location within the chip layout wherein a yield-indicative variable value falls in a low manufacturable range. The system then obtains yield scores for the hotspots, wherein a yield score indicates a failure probability for a corresponding hotspot. Next, the system predicts the manufacturing yield for the chip based on the hotspots and the yield scores for the hotspots.

31 Claims, 8 Drawing Sheets

PREDICTING IC MANUFACTURING YIELD BASED ON HOTSPOTS

BACKGROUND

1. Field of the Invention

The present invention relates to techniques for predicting manufacturing yield for integrated circuit chips. More specifically, the present invention relates to a method and apparatus for predicting manufacturing yield for integrated circuit chips based on hotspots and hotspot-related information collected within the integrated circuit chips.

2. Related Art

Dramatic improvements in semiconductor integration circuit (IC) technology presently make it possible to integrate hundreds of millions of transistors onto a single semiconductor IC chip. These improvements in integration densities have largely been achieved through corresponding improvements in semiconductor manufacturing technologies, which have recently achieved ultra-deep-submicron feature sizes.

On the flip side, the constant drive towards ever-decreasing feature sizes has led to a significant increase in manufacturing costs. One of the main causes of the increasing manufacturing costs is a significant decrease in manufacturing yield. Therefore, it is extremely desirable to be able to predict manufacturing yield at the design stage. A methodology that performs yield prediction and evaluation at the design stage is referred to as "design for manufacturability" (DFM).

Note that DFM can be used to improve design-related manufacturing yield for IC chips. More specifically, DFM facilitates identifying problematic regions in a chip layout from manufacturing yield perspective. This enables corrections and improvements to be made during the design stage to improve the ultimate manufacturing yield. Furthermore, the yield prediction and evaluation can facilitate formulating an objective function associated with the yield, wherein the objective function can be used for yield-aware layout optimization.

The IC manufacturing process can be viewed as a function. The inputs of this function typically include process parameters and chip layout patterns, and the outputs of this function are the physical variable values. By definition, a chip yield associated with a specific process-related physical variable is the probability that the variable values fall inside the manufacturing specifications (i.e., an upper bound and a lower bound) at all locations within the chip. For example, a chemical mechanical polishing (CMP) process-induced yield can be defined as the probability of a topography thickness being inside the specifications. We refer to these process-related physical variables as "yield-indicative variables" because their values can be used to extract the manufacturing yield. Also note that the yield associated with the process parameters and the chip layout patterns is a "systematic yield," which is distinct from a "random yield," such as random-partial-related yield.

IC manufacturing processes typically involve complex physical and chemical interactions. Because it is impossible to control these complex physical and chemical interactions perfectly, yield-indicative variable values tend to fluctuate around corresponding nominal values, leading to systematic yield loss. Complementary to the yield definition, yield loss associated with a yield-indicative variable is defined as the probability that the yield-indicative variable values fall outside the manufacturing specifications/bounds. Note that CMP-induced yield losses and lithography printability induced yield losses have become two of the significant systematic yield loss sources that result from the continuing reductions in IC feature sizes.

One existing approach for yield/loss prediction is the cumulative distribution function (CDF) approach. The CDF approach relies on having precise knowledge of both the distributions of a given yield-indicative variable at all chip locations and spatial correlations between these distributions. If such knowledge is available, a joint CDF can then be derived for this yield-indicative variable. Next, the total chip yield can be computed based on the derived joint CDF function. However, the feasibility of the CDF approach for predicting yield depends on the availability of the yield-indicative variable distributions.

Unfortunately, it is very difficult to perform yield prediction using the CDF approach because of the difficulties in obtaining the yield-indicative variable distributions. These difficulties arise for a number of reasons. (1) Precise process parameter distributions are extremely difficult to obtain due to both technical difficulties and proprietary information issues. (2) Process parameters affect the values and distributions of the yield-indicative variables through a highly non-linear process. Hence, even if the precise distributions of the process parameters can be obtained, they are substantially different from the distributions of the yield-indicative variables. For example, if the process parameter has a Gaussian distribution, the yield-indicative variables will typically have a non-Gaussian distribution. (3) The chip layout patterns also affect the values and distributions of the yield-indicative variables. Therefore, even if the process parameters are the same across an entire chip, the responses of the yield-indicative variable values at different chip locations can be different because of the different layout patterns. Consequently, the distributions of the yield-indicative variables at different chip locations can be different.

Because raw measurement data of the yield-indicative variables are extremely difficult to obtain from the fabrication plant (FAB) due to both technical difficulties and proprietary information issues, people tend to make assumptions and approximations about this data in order to use the CDF approach. Unfortunately, the errors introduced by these assumptions are typically quite unstable and unpredictable.

Hence, what is needed is a method and an apparatus for predicting IC manufacturing yield without the above-described problems.

SUMMARY

One embodiment of the present invention provides a system that predicts a manufacturing yield of a chip. During operation, the system first receives a chip layout. Next, the system identifies hotspots within the chip layout, wherein a hotspot is a location within the chip layout wherein a yield-indicative variable value falls in a low manufacturable range. The system then obtains yield scores for the hotspots, wherein a yield score indicates a failure probability for a corresponding hotspot. Next, the system predicts the manufacturing yield for the chip based on the hotspots and the yield scores for the hotspots.

In a variation on this embodiment, the system identifies the hotspots within the chip layout by: (1) receiving hotspot definitions, where the hotspot definitions specify ranges of the yield-indicative variable values which fall in a low manufacturable range; (2) performing a local process simulation on the chip layout to generate yield-indicative-variable values across the chip layout; and (3) identifying the hotspots based on the generated yield-indicative-variable values and the hotspot definitions.

In a further variation on this embodiment, the system obtains the yield scores for the hotspots by extracting the yield scores from measurement data or by performing a local process simulation.

In a variation on this embodiment, the yield score can be a number between 0 and 1, or normalized to a value between 0 and 1, and the yield score value is monotonic with the failure probability for a corresponding hotspot.

In a variation on this embodiment, the yield scores for the hotspots are spatially correlated with each other.

In a further variation on this embodiment, the system predicts the manufacturing yield for the chip based on the yield scores for the hotspots by applying a transformation T to each of the yield scores to obtain transformed yield scores which are independent of each other, wherein the transformation T is configured to decouple the spatial correlations between the yield scores; and computing the manufacturing yield for the chip by multiplying individual transformed yield scores.

In a further variation, the yield-indicative variable z is related to the yield score y at each hotspot by a yield score function $f$ such that $y=f(z)$.

In a further variation, the system applies the transformation T to the yield scores to obtain transformed yield scores by: (1) applying an inverse yield-score-function $f^{-1}$ to the yield scores to obtain original yield-indicative-variable values; (2) applying a linear transformation L to the original yield-indicative-variable values to obtain transformed yield-indicative-variable values which are independent of each other, wherein the linear transformation L decomposes spatial correlations between the original yield-indicative-variable values; and (3) applying the yield-score-function $f$ to the transformed yield-indicative-variable values to obtain the transformed yield scores.

In a further variation, the transformation T and the linear transformation L are related to each other such that $T(y)=f\{L[f^{-1}(y)]\}$.

In a further variation, the yield score function $f$ is a non-linear function of the yield-indicative variable.

In a further variation, the system obtains the linear transformation L by obtaining a spatial-correlation matrix for yield-indicative-variable values associated with the hotspots, wherein the spatial-correlation matrix specifies the spatial correlations between yield-indicative-variable values; and obtaining the linear transformation L by deriving a linear transformation which is configured to decompose the spatial-correlation matrix.

In a further variation, the system uses an approximated yield-score-function g for the yield-score-function $f$ and additionally uses an approximated inverse yield-score-function $g^{-1}$ for the inverse yield-score-function $f^{-1}$.

In a further variation, the yield-indicative variable at each hotspot is associated with a distribution which is characterized by a mean and a variance, and the yield-indicative variable can have distinct distributions at different hotspots.

In a further variation, the yield score function $f$ is a function of the following parameters: the mean and the variance of the yield-indicative variable, an upper manufacturing bound, and a lower manufacturing bound.

In a further variation, the system centers the distributions of the yield-indicative variable at each of the hotspots to obtain zero-mean values for the distributions. The system also scales the distributions of the yield-indicative variable at each of the hotspots to obtain unit-variance values for the distributions. After centering and scaling, the upper and lower manufacturing bounds become functions of the original mean and variance of the corresponding distribution.

In a variation on this embodiment, the yield-indicative variable can include a thickness for a chemical mechanical polishing (CMP) process; a critical dimension (CD) for a lithography process; and any other manufacturing process-related physical variables.

BRIEF DESCRIPTION OF THE FIGURES

Table 1A illustrates CMP-related hotspot definitions in accordance with an embodiment of the present invention.

Table 1B illustrates photolithography-related hotspot definitions in accordance with an embodiment of the present invention.

Table 2 summarizes the simulation results when a real distribution is a Rayleigh distribution in accordance with an embodiment of the present invention.

Table 3 summarizes the simulation results when a real distribution is a Laplace distribution in accordance with an embodiment of the present invention.

DETAILED DESCRIPTION

Integrated Circuit Design Flow

Figure 1:
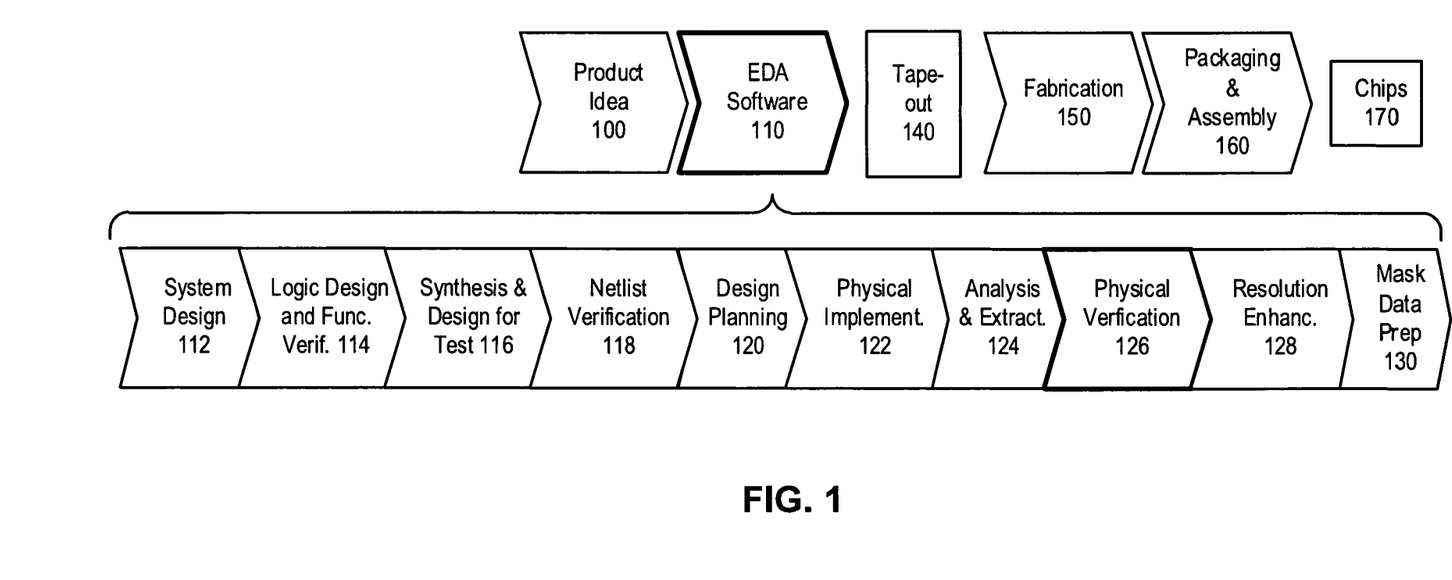
FIG. 1 illustrates various steps in the design and fabrication of an integrated circuit in accordance with an embodiment of the present invention.

FIG. 1 illustrates various steps in the design and fabrication of an integrated circuit in accordance with an embodiment of the present invention.

The process starts with the product idea (step 100) which is realized using an EDA software design process (step 110). When the design is finalized, it can be taped-out (event 140). After tape out, the fabrication process (step 150) and packaging and assembly processes (step 160) are performed which ultimately result in finished chips (result 170).

The EDA software design process (step 110), in turn, comprises steps 112-130, which are described below. Note that the design flow description is for illustration purposes only. This description is not meant to limit the present invention. For example, an actual integrated circuit design may require the designer to perform the design steps in a different sequence than the sequence described below. The following discussion provides further details of the steps in the design process.

System design (step 112): The designers describe the functionality that they want to implement. They can also perform what-if planning to refine functionality, check costs, etc. Hardware-software architecture partitioning can occur at this stage. Exemplary EDA software products from Synopsys, Inc. that can be used at this step include Model Architect, Saber, System Studio, and DesignWare® products.

Logic design and functional verification (step 114): At this stage, the VHDL or Verilog code for modules in the system is written and the design is checked for functional accuracy. More specifically, the design is checked to ensure that it produces the correct outputs. Exemplary EDA software products from Synopsys, Inc. that can be used at this step include VCS, VERA, DesignWare®, Magellan, Formality, ESP and LEDA products.

Synthesis and design for test (step 116): Here, the VHDL/Nerilog is translated to a netlist. The netlist can be optimized for the target technology. Additionally, tests can be designed and implemented to check the finished chips. Exemplary EDA software products from Synopsys, Inc. that can be used at this step include Design Compiler®, Physical Compiler, Test Compiler, Power Compiler, FPGA Compiler, Tetramax, and DesignWare® products.

Netlist verification (step 118): At this step, the netlist is checked for compliance with timing constraints and for correspondence with the VHDL/Verilog source code. Exemplary EDA software products from Synopsys, Inc. that can be used at this step include Formality, PrimeTime, and VCS products.

Design planning (step 120): Here, an overall floorplan for the chip is constructed and analyzed for timing and top-level routing. Exemplary EDA software products from Synopsys, Inc. that can be used at this step include Astro and IC Compiler products.

Physical implementation (step 122): The placement (positioning of circuit elements) and routing (connection of the same) occurs at this step. Exemplary EDA software products from Synopsys, Inc. that can be used at this step include the Astro and IC Compiler products.

Analysis and extraction (step 124): At this step, the circuit function is verified at a transistor level, this in turn permits what-if refinement. Exemplary EDA software products from Synopsys, Inc. that can be used at this step include AstroRail, PrimeRail, Primetime, and Star RC/XT products.

Physical verification (step 126): In this step, the design is checked to ensure correctness for manufacturing, electrical issues, lithographic issues, and circuitry. Exemplary EDA software products from Synopsys, Inc. that can be used at this step include the Hercules product.

Resolution enhancement (step 128): This step involves geometric manipulations of the layout to improve manufacturability of the design. Exemplary EDA software products from Synopsys, Inc. that can be used at this step include Progen, Proteus, ProteusAF, and PSMGen products.

Mask data preparation (step 130): This step provides the "tape-out" data for production of masks to produce finished chips. Exemplary EDA software products from Synopsys, Inc. that can be used at this step include the CATS(R) family of products.

Embodiments of the present invention can be used during one or more of the above described steps. Specifically, one embodiment of the present invention can be used during the physical verification step 126.

Terminology

Throughout the specification, the following terms take the meanings provided herein, unless the context clearly dictates otherwise. The term "yield" or "yield loss" means "systematic yield" or "systematic yield loss," respectively. The term "hotspot" means a location (e.g., a spot or a small area/region) within a chip layout wherein a yield-indicative variable value falls in a low manufacturable range. Note that the regions which are indicated as hotspots can have variable sizes.

Overview

One embodiment of the present invention provides a technique for predicting a chip manufacturing yield based on hotspots located within the chip layout. More specifically, the present invention identifies the hotspots within the chip layout and obtains yield scores (i.e., failure probabilities) for the identified hotspots. Next, the manufacturing yield is computed by combining individual hotspot yield scores while taking into account their spatial correlations.

While combining individual hotspot yield scores during the manufacturing yield computation, one embodiment of the present invention derives a transformation that can be directly applied to the hotspot yield scores to decouple their spatial correlations. After applying the transformation to the yield scores, the transformed hotspot yield scores are independent of each other. Hence, the manufacturing yield for the chip can be predicted by simply multiplying the individual transformed yield scores.

The proposed yield-prediction technique is applicable to any systematic yield loss mechanism in DFM that may or may not involve spatial correlations. Such applications can include, but are not limited to the CMP yield prediction and the lithography yield prediction. Furthermore, the proposed yield-prediction technique is also applicable to parametric yield prediction.

In the following sections, we present the details for the hotspot-based yield prediction technique. We begin with introducing the required information of this technique.

Required Information for Yield Prediction

Embodiments of the present invention use the following information obtained from the FAB or through process simulation for yield prediction.

The Hotspot Definitions

"Hotspot definitions" refers to a FAB-provided data set which specifies ranges of yield-indicative-variable values. Typically, FABs provide hotspot definitions to their customers so that the IC designers can avoid triggering hotspots during the process of designing the chip.

Table 1A and Table 1B illustrate CMP-related and photo-lithography-related hotspot definitions in accordance with an embodiment of the present invention. Note that these tables have been modified from the original FAB-provided hotspot definitions to ensure confidentiality and at the same time to demonstrate the concept of how the hotspots are typically specified by the FABs.

The hotspot definitions can include a set of yield-indicative variables (the first column in each table) and ranges of the yield-indicative variable values (the second column in each table). For example, a specific range of CMP thickness values is between 700 angstroms and 800 angstroms. The hotspot definitions can also include weight values for the hotspots (the third column in Table 1B). As seen in Table 1B, the weight values rate the risk of failure for the corresponding hotspots. Note that when the hotspot definitions are available, the designers can perform process simulations to identify hotspots in a given chip layout based on the hotspot definitions.

In addition to obtaining the hotspot definitions directly from the FAB, the hotspot definitions can also be retrieved from FAB-recommended design rules. In a further embodiment, the hotspot definitions are automatically generated by users performing a yield sensitivity study on known layout patterns.

Yield Scores of the Hotspots

A yield score can be a number between 0 and 1 (or normalized to a value between 0 and 1) that indicates a failure probability for a corresponding hotspot. Note that yield scores can equal the exact failure probability values, which are between 0 and 1. Alternatively, yield scores and failure probabilities can be related through functions. In one embodiment of the present invention, the functions that relate yield scores to the failure probabilities are monotonic functions. Note that the accuracy of the predicted yield is at the same level as the accuracy of the provided hotspot yield scores. Examples of CMP- and lithography-related hotspot yield scores for the corresponding ranges of the yield-indicative variable values can be found in the last column of Table 1A and Table 1B. For example, a CMP-related metal thickness greater than 900 angstroms is associated with a yield score of 0 in Table 1A. Note that the yield scores for different hotspots are spatially correlated with each other.

In addition to extracting the hotspot yield score from the FAB-provided data, the yield score can also be computed by means of local process simulations. Note that deriving local yield scores by local process simulation does not require knowledge of spatial correlation or joint distribution between the hotspots.

Spatial-Correlation Matrix for the Yield-Indicative Variable Values

Spatial-correlation matrix for the yield-indicative variable values is typically provided by the FAB to specify the spatial correlations between the yield-indicative-variable values associated with the hotspots. Note that the yield scores for the hotspots can be spatially correlated with each other. However, the spatial correlation between the yield scores for a pair of hotspots is different from the spatial correlation between the yield-indicative-variable values associated with the pair of hotspots. In one embodiment of the present invention, the spatial-correlation matrix for the yield-indicative variable values can be used indirectly (through transformation) to facilitate decoupling the correlations between hotspots yield scores. We describe this transformation in more detail below.

In addition to obtaining the spatial-correlation matrix from the FAB, the spatial-correlation matrix can also be obtained through local process simulation. In one embodiment of the present invention, a chip layout can be partitioned and a comprehensive correlation matrix can be constructed through process simulation to specify spatial correlations between different partitioned regions within the chip layout. Next, when the hotspots are located within the chip layout, the spatial correlation between the hotspot locations can be obtained through a quick lookup in the comprehensive correlation matrix. In a further embodiment, the spatial-correlation matrix for the yield-indicative variable values can be approximated as a function of the hotspot locations and based on distance dependency between the hotspots.

Process of Yield Prediction Based on Hotspots

Figure 2:
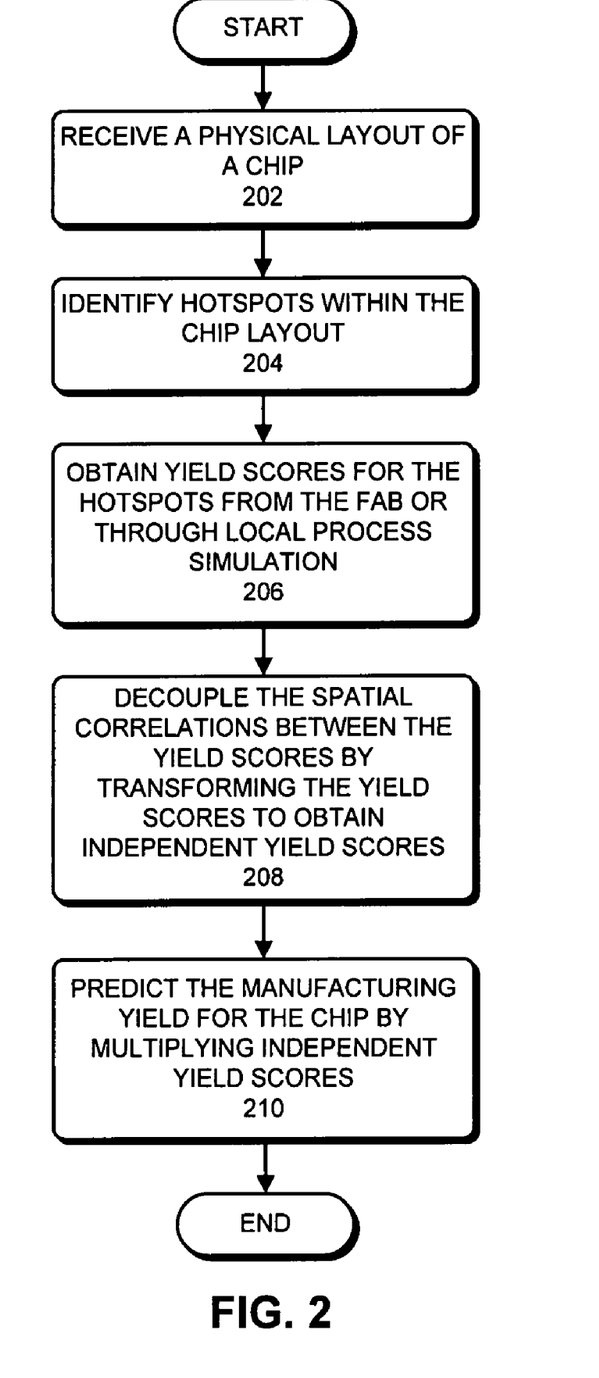
FIG. 2 presents a flowchart illustrating the process of predicting the manufacturing yield of a chip based on hotspots within the chip layout in accordance with an embodiment of the present invention.

FIG. 2 presents a flowchart illustrating the process of predicting the manufacturing yield for a chip based on hotspots within the chip layout in accordance with an embodiment of the present invention.

Figure 3:
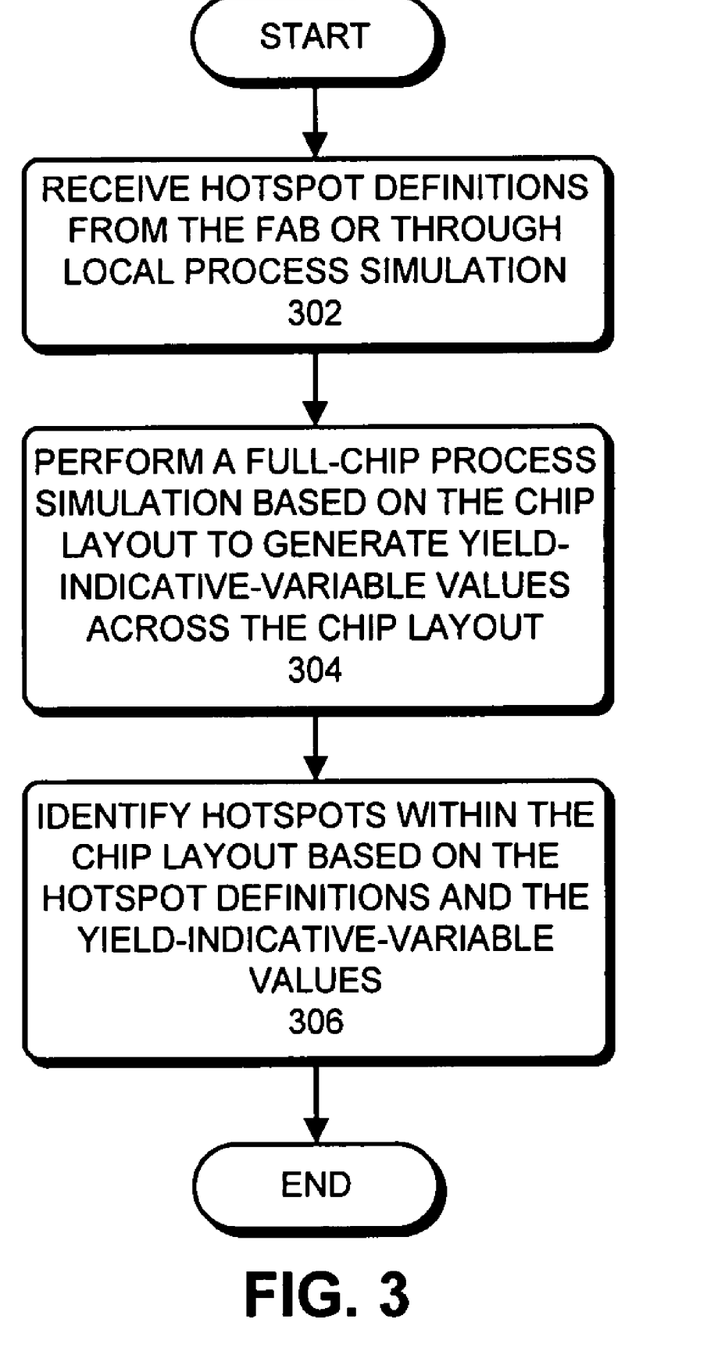
FIG. 3 presents a flowchart illustrating the process of identifying hotspots within the chip layout in accordance with an embodiment of the present invention.

During operation, the system starts by receiving a physical design layout of the chip (i.e., the chip layout) (step 202). Next, the system identifies hotspots within the chip layout (step 204). FIG. 3 presents a flowchart illustrating the process of identifying hotspots within the chip layout in accordance with an embodiment of the present invention.

As seen in FIG. 3, the system first receives hotspot definitions either provided by the FAB, or by using other aforementioned methods (step 302). Next, the system performs a full-chip process simulation based on the chip layout to generate yield-indicative-variable values across the chip layout (step 304). The system then identifies the hotspots within the chip based on the hotspot definitions and the generated yield-indicative-variable values (step 306).

Referring back to FIG. 2, when the hotspots are identified, the system obtains yield scores for the hotspots, wherein the yield scores are either provided by the FAB or through local process simulation (step 206). Note that the yield scores for the hotspots are typically spatially correlated with each other. However, this spatial-correlation information is typically not available.

Next, the system applies a transformation T to each of the yield scores to obtain transformed yield scores which are independent of each other, wherein the transformation T is capable of decoupling the spatial correlations between the yield scores (step 208). The system then predicts the manufacturing yield for the full chip by multiplying independent transformed yield scores (step 210). In one embodiment of the present invention, if the original yield scores are substantially independent of each other, the system does not perform step 208.

Note that although we described the yield prediction process for a chip, the proposed hotspot-based yield prediction technique is not limited to predicting yield for a full chip. The general technique can also be applied to predict the yield for a wafer, an area within a wafer, or a subsection within a chip.

Note that when two hotspots are spatially correlated, their corresponding yield scores are typically spatially correlated. As mentioned above, the spatial correlations between the yield-indicative variable values for each pair of hotspots can be obtained from the FAB or through a local process simulation. However, these correlations are different from the correlations between yield scores for each pair of hotspots. In order to decouple the spatial correlations between the yield scores, one embodiment of the present invention performs conversions between the yield-indicative variable space and the yield score space. Through these conversions, the decomposition on the yield-indicative variable correlation matrix can be translated into the decomposition on the yield scores. We describe decoupling of the yield scores in more detail below.

Deriving Transformation T

We first define a functional relationship between the yield scores y and their corresponding yield-indicative variable values z by using a yield score function $f(\ )$ such that $y=f(z)$. Note that $f(\ )$ specifies a one-to-one correspondence at each hotspot i such that $y_i=f(z_i)$. Conversely, there exists an inverse function $f^{-1}(\ )$ such that $z=f^{-1}(y)$ and $z_i=f^{-1}(y_i)$. Note that both functions $f(\ )$ and $f^{-1}(\ )$ can be highly nonlinear.

Figure 4:
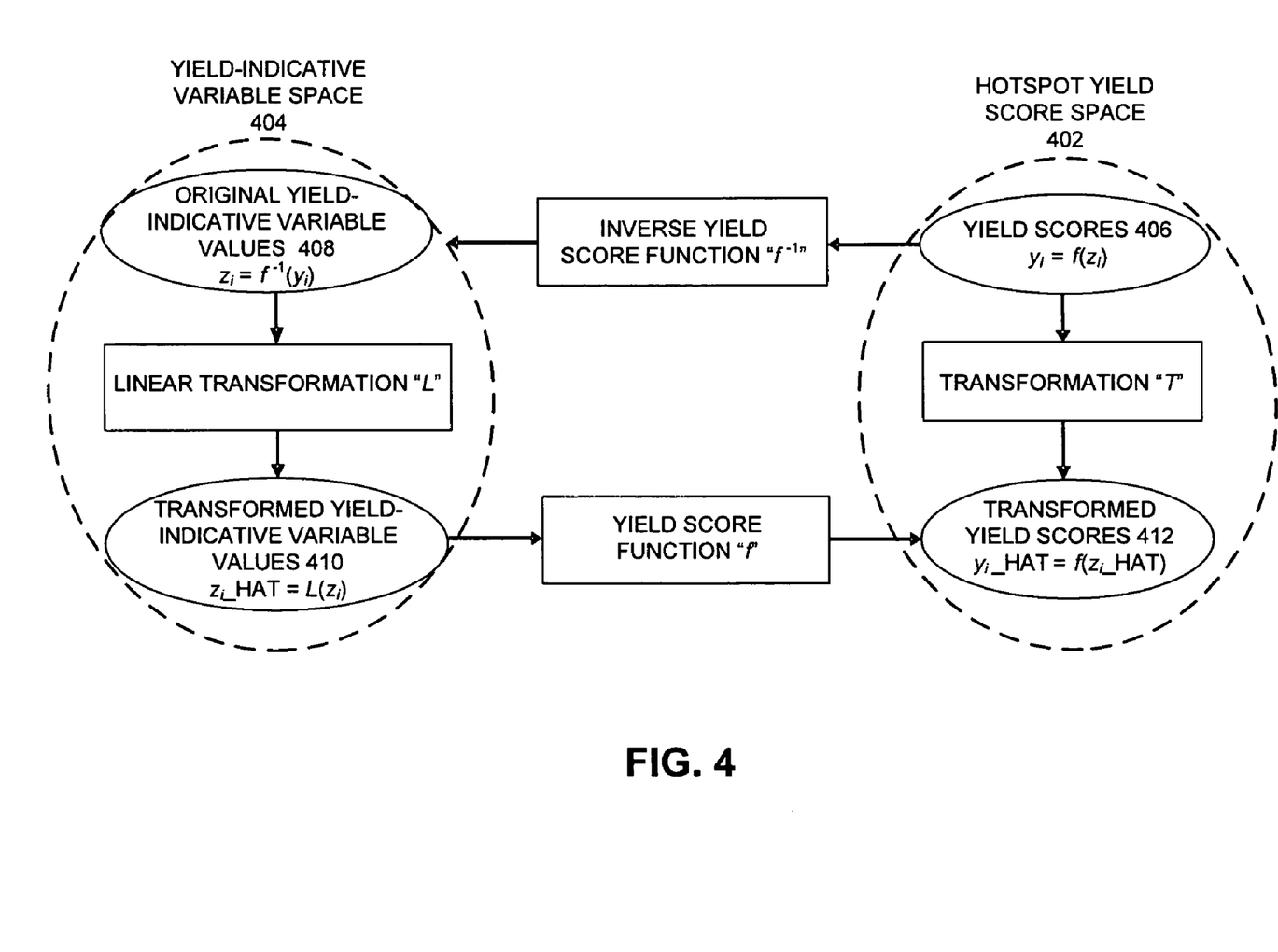
FIG. 4 presents a diagram illustrating transformations between the yield-indicative variable space and the yield score space in accordance with an embodiment of the present invention.

FIG. 4 presents a diagram illustrating transformations between the yield-indicative variable space and the yield score space in accordance with an embodiment of the present invention.

Note that FIG. 4 comprises two large dotted circles representing two solution spaces: (1) hotspot yield score space 402 and (2) yield-indicative variable space 404. The arrows between the two circles illustrate the conversions between the two solution spaces. Note that hotspot yield score space 402 includes hotspot yield scores 406, which are spatially correlated with each other. Each yield score $y_i$ is associated with an original yield-indicative variable value $z_i$ through the yield score function $f(\ )$ such that $y_i = f(z_i)$.

Within yield score space 402, a transformation T is applied to individual yield scores 406 to transform them into transformed yield scores 412 that are independent of each other (e.g., without spatial correlations). Because the spatial correlations between hotspot yield scores 406 are typically unavailable, it is typically not possible to implement transformation T directly within hotspot yield score space 402.

Figure 5:
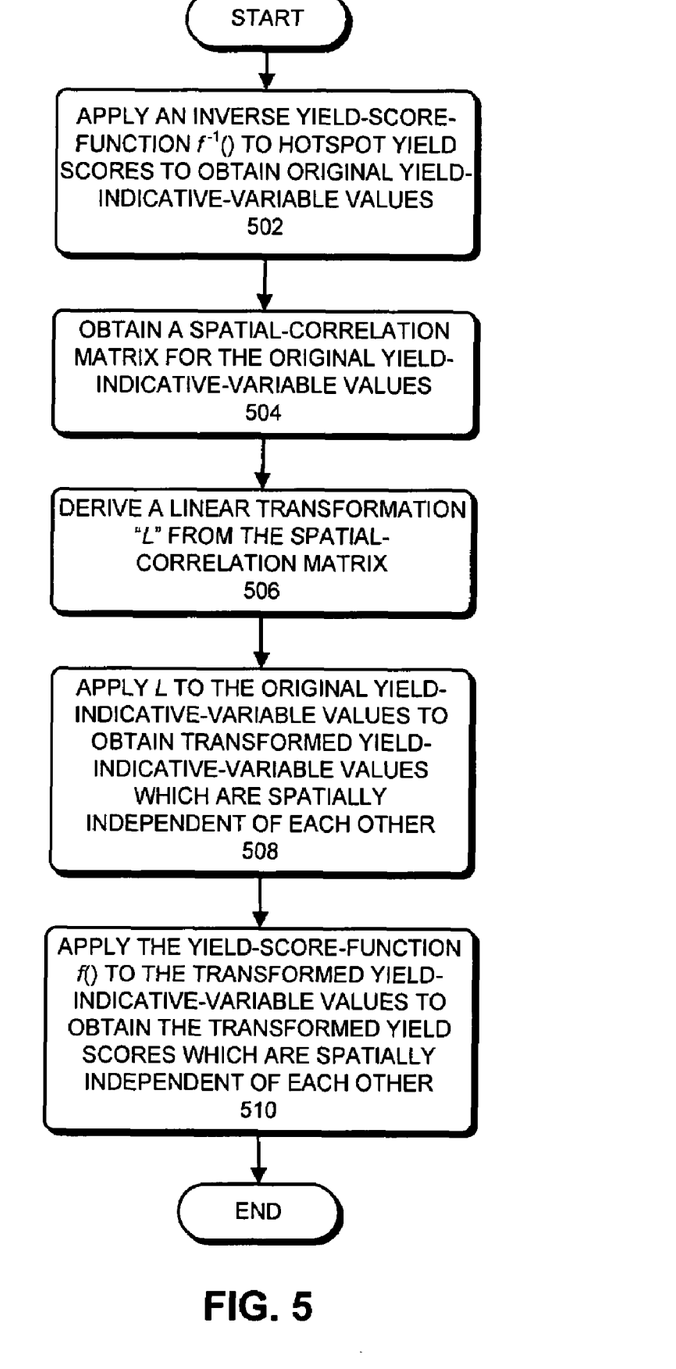
FIG. 5 presents a flowchart illustrating the process of deriving transformation T in the yield-indicative variable space in accordance with an embodiment of the present invention.

FIG. 5 presents a flowchart illustrating the process of deriving transformation T in the yield-indicative variable space in accordance with an embodiment of the present invention. Note that FIG. 5 is described in conjunction with FIG. 4.

During operation, the system applies an inverse yield-score-function $f^{-1}(\ )$ to yield scores 406 to obtain original yield-indicative-variable values 408 (step 502). As seen in FIG. 4, inverse yield-score-function $f^{-1}(\ )$ converts yield scores 406 from hotspot yield-score space 402 into original yield-indicative variable values 408 in yield-indicative variable space 404, wherein each variable value $z_i$ is associated with a corresponding yield score $y_i$ through the inverse yield score function $f^{-1}(\ )$ such that $z_i = f^{-1}(y_i)$.

Next, the system obtains a spatial-correlation matrix for the original yield-indicative-variable values (step 504). Note the system can obtain the correlation matrix either directly from the FAB or by using one of the alternative aforementioned methods.

The system then derives a linear transformation L from the spatial-correlation matrix (step 506). One skilled in the art will realize that for a given correlation matrix Σ, one can apply a standard decomposition technique to decompose the correlations and subsequently obtain a transformed correlation matrix Λ which is diagonalized. Note that the diagonal matrix Λ has all of its off-diagonal entries equal zero. In one embodiment of the present invention, this decomposition process can be expressed as: $\Sigma = L\Lambda L^T$, wherein L is the linear transformation being derived. Examples of these standard decomposition techniques can include, but are not limited to Principal Component Analysis (PCA) or Independent Component Analysis (ICA).

When the linear transformation L is derived, the system applies transformation L to original yield-indicative-variable values 408 to obtain transformed yield-indicative-variable values 410 which are independent of each other (step 508). Specifically, the system applies the linear transformation L to each yield-indicative-variable value $z_i$ to obtain a transformed yield-indicative-variable value $\hat{z}_i$, which decomposes spatial correlations between the original yield-indicative-variable values. Hence the transformed yield-indicative-variable values at any two different hotspots are uncorrelated. Note that $\hat{z}_i = L[z_i] = L[f^{-1}(y_i)]$.

Next, the system applies the yield-score-function $f(\ )$ to the transformed yield-indicative-variable values 410 to obtain the transformed yield scores 412 (step 510). As seen in FIG. 4, yield score function $f(\ )$ converts transformed yield-indicative-variable values 410 from yield-indicative variable space 404 back to hotspot yield-score space 402, wherein each transformed yield score $\hat{y}_i$ is associated with a corresponding $\hat{z}_i$, through the yield score function $f(\ )$ such that $\hat{y}_i = f(\hat{z}_i)$. Consequently, we obtain spatially decoupled yield score, $\hat{y}_i = f\{L[f^{-1}(y_i)]\}$. Note that this combined conversion and transformation procedure is equivalent to the transformation T in hotspot yield score space 402. Hence, we derive the expression for T in terms of L, $f(\ )$, and $f^{-1}(\ )$ as:

$$T(y_i) = f\{L[f^{-1}(y_i)]\}, \qquad \text{(Eqn. 1)}$$

which is configured to decouple the correlations between the given hotspot yield scores.

Figure 6A:
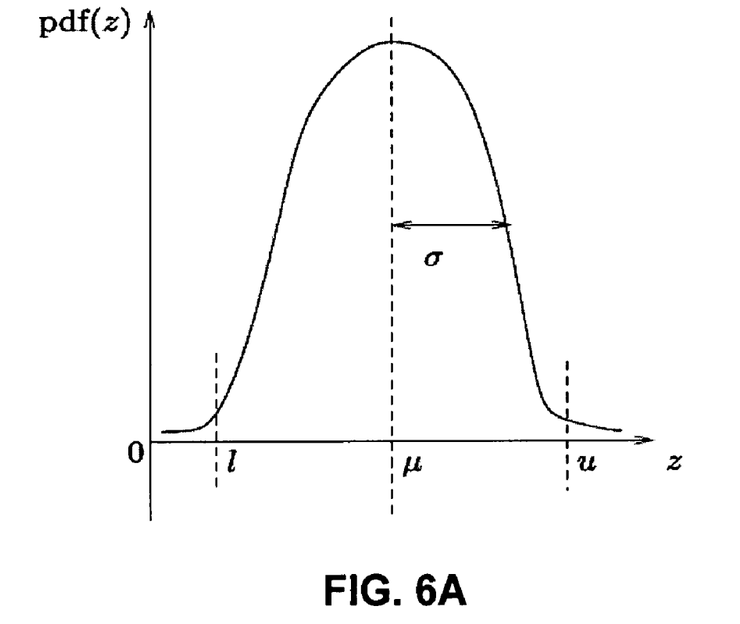
FIG. 6A illustrates an exemplary pdf function and the associated mean, variance, and manufacturing bounds in accordance with an embodiment of the present invention.

In one embodiment of the present invention, the yield-indicative variables are statistical variables and the associated variable value at each hotspot is characterized by a statistical distribution with a mean (or nominal) value µ and a variance value σ. Note that the mean value can be obtained through process simulation using typical process set up while the variance can be obtained from the diagonal entries of the correlation matrix. Consequently, the yield score function produces a yield score for a hotspot based on the given yield-indicative variable's statistical distribution and the FAB-provided manufacturing bounds. In one embodiment, the yield score can be formulated as:

$$y_i = \int_l^u pdf(z)\,dz = f(\mu, \sigma, l, u), \qquad \text{(Eqn. 2)}$$

wherein l and u are the lower and upper manufacturing bounds, z is the yield-indicative variable, µ and σ are the distribution statistics for z, and $pdf(z)$ presents the probability density function of z. FIG. 6A illustrates an exemplary pdf of z associated with mean µ, variance σ, and manufacturing bounds l and u in accordance with an embodiment of the present invention.

Note that the yield score function $f(\ )$ and the inverse function $f^{-1}(\ )$ provide an important link between transformation L and transformation T. However, because of the statistical nature of the yield-indicative variables, obtaining yield-indicative variable values from the hotspot yield scores using Eqn. 2 would require knowing the exact functional form of the complicated multi-parameter function $f(\mu, \sigma, l, u)$.

In one embodiment of the present invention, instead of attempting to find the exact expression for the yield score function and its inverse in deriving transformation T, these two functions are used implicitly through an approximation process. We describe how we approximate the yield score function and the inverse function to derive the transformation T below.

Approximating Yield Score Function and the Associated Inverse Function

Figure 7:
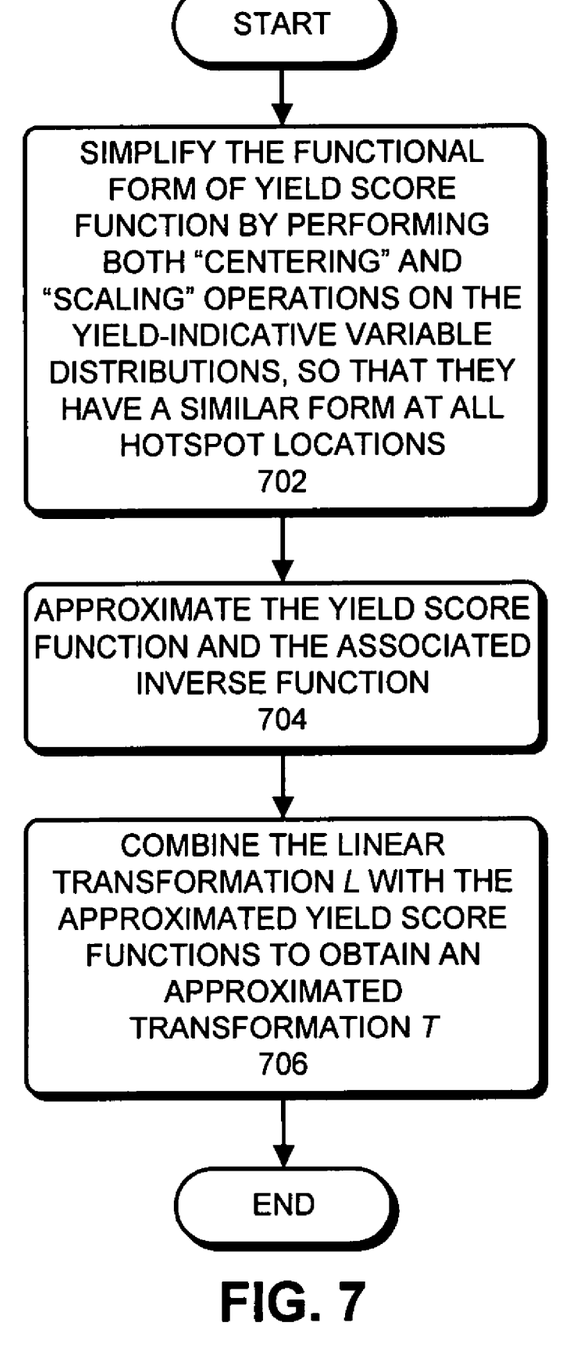
FIG. 7 presents a flowchart illustrating the process of approximating yield score function in accordance with an embodiment of the present invention.

FIG. 7 presents a flowchart illustrating the process of approximating yield score function in accordance with an embodiment of the present invention.

During this process, the system first simplifies the functional form of yield score function $f(\mu, \sigma, l, u)$ by performing both centering and scaling operations on the yield-indicative variable distributions, so that they have a similar form at all hotspot locations (step 702). More specifically, before this operation, the original yield-indicative variable can have different distributions at different hotspot locations (due to different µ, σ). The positions and shapes of the distribution curves are typically determined by the mean values and variances (as seen in FIG. 6A). If we use the mean values and the variances to determine the amount of centering and scaling, performing the centering and scaling operations produces new distributions with a zero-mean and a unit-variance. In one embodiment, a Normal distribution (i.e., a zero-mean and unit-variance Gaussian distribution) can be used to approximate this distribution at all hotspots. Note that as a result of the centering and scaling operations, the manufacturing bounds l and u are also shifted and scaled, and the shifted and scaled manufacturing bounds $\tilde{l}$ and $\tilde{u}$ become functions of the original mean and variance of the yield-indicative variable.

Figure 6B:
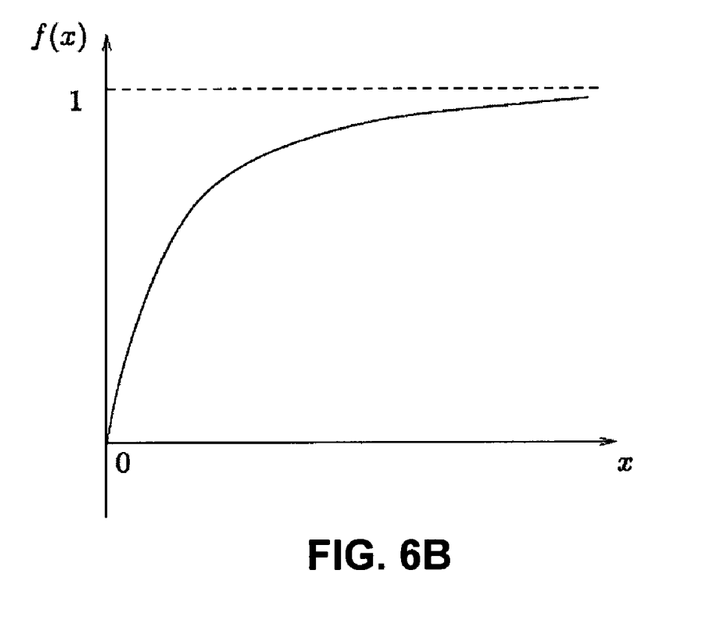
FIG. 6B illustrates a yield score function associated with the shifted and scaled bounds in accordance with an embodiment of the present invention.

Note that after step 702, the simplified yield score function $f(\ )$ has the same functional form at all hotspot locations, but the remaining function parameters are different at different locations. These function parameters include the transformed manufacturing bounds $\tilde{l}$ and $\tilde{u}$, which now depend on the values of the distribution statistics of the original yield-indicative variables. For example, after centering and scaling the yield score function of Eqn. 2, we obtain yield score function $f_i = f(0, 1, \tilde{l}_i, \tilde{u}_i)$ for each hotspot i wherein $\tilde{l}_i$ and $\tilde{u}_i$ are the parameters for the new yield score function, and are both functions of $\mu_i$ and $\sigma_i$. FIG. 6B illustrates a yield score function $f(x)$ associated with the shifted and scaled bounds $\tilde{l}$ and $\tilde{u}$ in accordance with an embodiment of the present invention. Note that x is the combined function of $\tilde{l}$ and $\tilde{u}$ in FIG. 6B.

Next, the system approximates yield score function $g(\ )$ for $f(\ )$ and the approximated inverse function $g^{-1}(\ )$ for $f^{-1}(\ )$ (step 704). Specifically, the system approximates the yield score function by choosing the associated pdf with zero-mean and unit-variance. For example, the system can choose a normal distribution with $\mu=0$ and $\sigma=1$. Referring to Eqn. 2, the bounds of the integration after centering and scaling become $\tilde{l}$ and $\tilde{u}$. Note that if we assume that $\tilde{l}=-\tilde{u}$, the integral becomes the definition of an error function. Hence, we obtain the approximated function $g(\ )=\text{erf}(\tilde{u})$ and from $g(\ )$ we can obtain inverse function $g^{-1}(\ )$. Note that the approximated yield score function has to satisfy the same constraints as $f(\ )$: monotonic to failure probabilities, and between 0 and 1.

Note that although we illustrate using a normal distribution to approximate $f(\ )$, the proposed yield-prediction technique is not limited to any particular distribution assumption. Furthermore, other simplification techniques can be used during this approximation. For example, one can use curve fitting to approximate $f(\ )$ as polynomial, or piecewise linear functions. Hence, the proposed yield-prediction technique is also not limited to any particular approximation technique.

Note that to match the centering and scaling operations of step 702, the linear transformation L on the correlation matrix of the yield measuring variable is reconfigured to include the centering and scaling operations prior to the decomposition operation. This inclusion into L is straightforward because both centering and scaling operations are also linear transformations.

Finally, the system combines the linear transformation L with approximated yield score functions $g(\ )$ and $g^{-1}(\ )$ to obtain the approximated transformation $T=g\{L[g^{-1}(y)]\}$ (step 706). The system can then apply the approximated transformation T on a given hotspot yield score to produce the transformed yield scores associated with the independent yield-indicative variables. These transformed yield scores are independent of each other and can be directly multiplied together to compute the total yield score.

Note that the proposed yield-prediction technique does not require the exact yield score functions $f(\ )$ and $f^{-1}(\ )$ to be provided, because both functions can be used in their approximated forms. It can be shown that the errors involved in the approximation of $f(\ )$ and $f^{-1}(\ )$ will not propagate through the steps of the derivation, but are reduced and bounded instead. In particular, it can be shown that if the approximation error is bounded, then the approximation error in $f^{-1}(\ )-g^{-1}(\ )$ introduced by the conversion from the hotspot yield-score space into yield-indicative variable space and the approximation error in $f(\ )-g(\ )$ introduced by the conversion from the yield-indicative variable space back to hotspot yield-score space substantially cancel each other.

Moreover, it can be shown that the final error in the predicted yield is:

$$e = |g[L(g^{-1}(y_1), \ldots, g^{-1}(y_n))] - f[L(f^{-1}(y_1), \ldots, f^{-1}(y_n))]| \quad \text{(Eqn. 3)}$$
$$<= \max_i \{|g^{-1}(y_i) - f^{-1}(y_i)|\},$$

which suggests that the final error in the predicted yield is bounded by the maximum approximation error between the exact function $f^-(\ )$ and approximated function $g^{-1}(\ )$.

EXAMPLES

We now present a few illustrative numerical examples to demonstrate the performance of the proposed yield prediction technique.

In these experiments, we study two hotspots, which are associated with failure rates of $ffr_1=7.22\%$ and $ffr_2=31.09\%$, respectively. However, note that the proposed technique can be applied to any number of hotspots. The spatial correlations and variances of the yield-indicative variable on these two hotspots can be obtained from the covariance matrix $\Sigma=[4, 0.81; 0.81, 9]$. Moreover, the mean values of the yield-indicative variable on these two hotspots can be obtained from process simulation with nominal condition. In these experiments, the mean values are set as $p=[3.8; 5.7]$. Based on the given hotspot definitions, manufacturing bounds can be obtained. In these examples, we set the lower bound to be l=0, and upper bound to be u=7.

We further assume a few real distributions on these two hotspots, for example, a Rayleigh distribution with given means and variances. This information is used only for computing the true yield values for comparison purposes.

We apply the proposed hotspot-based yield prediction technique to compute the yield. The predicted yield values are then compared with the true yield values to determine the yield prediction error. To compare the quality of the results, we also implement the CDF approach in these examples.

Figure 8A:
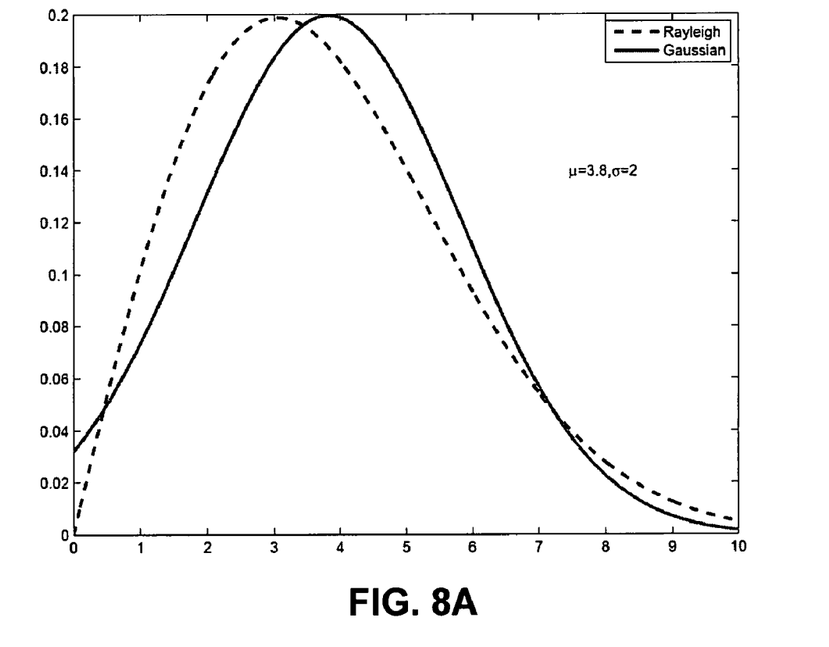
FIG. 8A illustrates the difference between two distribution curves (Rayleigh and Gaussian) having the same mean and variance in accordance with an embodiment of the present invention.

Before showing the simulation results, we first demonstrate how much error can be introduced by the insufficient knowledge of the distribution. FIG. 8A illustrates two distribution curves having the same mean and variance in accordance with an embodiment of the present invention. The dashed curve represents the real (e.g., Rayleigh) distribution, whereas the solid curve represents the approximated (e.g., Gaussian) distribution. Although the two distributions share the same mean and variance, it can be clearly observed that the difference between the two curves is quite large. This difference is a primary source for the final error in the predicted yield. In the CDF approach, this difference is directly reflected in the final prediction error. This error can be quite large in some cases, while relatively small in some other cases. Hence, the error is quite unstable and unpredictable. In comparison, the proposed hotspot-based yield-prediction technique uses both the forward yield score function and the inverse yield score function. Consequently, the errors in the approximation steps do not propagate to the final prediction error. Instead, the major portion of the errors is canceled, and therefore the find prediction error is significantly reduced and bounded.

Table 2 illustrates the simulation results for a number of cases where the correlation between the two hotspots varies in accordance with an embodiment of the present invention. In the first column, covariance $\sigma_{12}=1$ means that the two hotspots are fully correlated, whereas $\sigma_{12}=0$ means the two hotspots are completely unrelated. The second column shows the true yield values for these cases. The third and fourth columns show the predicted yield values and relative errors from using the proposed hotspot-based technique. The last two columns show the predicted yield values and relative errors from the CDF approach. It can be observed that the approximation errors from the hotspot-based technique are quite stable and stay within a small error range. In contrast, the errors from the CDF approach are significantly greater.

Figure 8B:
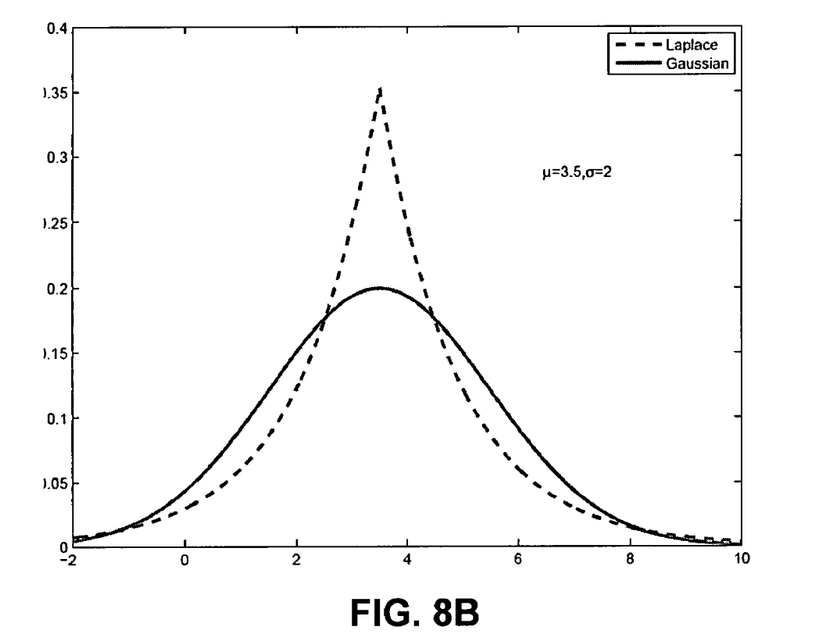
FIG. 8B illustrates the difference between two distribution curves (Laplace and Gaussian) in accordance with an embodiment of the present invention.

The second set of experiments is performed to illustrate how sensitive the two yield prediction methods are to the errors in approximating the unknown distributions. In this set of experiments, the true distribution on the two hotspots is changed to Laplace distribution. FIG. 8B illustrates the difference between the real (e.g., Laplace) distribution and the approximated (e.g., Gaussian) distribution in accordance with an embodiment of the present invention.

The dashed curve and solid curve represent the real and the approximated distributions, respectively, wherein the two distributions have the same mean and variance. Table 3 summarizes the simulation results when a real distribution is a Laplace distribution in accordance with an embodiment of the present invention. In this example, the failure rates on the two hotspots are $fr_1=8.95\%$ and $fr_2=19.21\%$. These results demonstrate that the prediction error from the CDF approach relies heavily on the "closeness" of the approximated distribution to the real distribution. In this set of experiments, the difference between the two distributions is less than that in the first set of experiments, which gives rise to the improved prediction error in the CDF approach. However, in practice the exact distribution on the hotspots is unknown. Hence, it is impossible to predict how large the error will be in the predicted yield based on the CDF approach.

On the other hand, using the hotspot-based technique the prediction error stays stably within a small error range, and is insensitive to the difference between the selected approximated distribution and the real distribution.

CONCLUSION

The present invention provides a hotspot-based systematic yield prediction technique for manufacturing yield prediction based on hotspot definitions, hotspot yield scores, and spatial correlations between the hotspots. To manage the difficulty that the direct spatial correlation between hotspot yield scores is unknown, the present technique transforms the yield predict problem between the yield score space and the yield-indicative variable space in order to derive a transformation T. This derived transformation directly decouples the correlation between the given hotspot yield scores. Furthermore, the present technique allows approximations to be made in deriving the transformation T. The approximation errors associated with the approximation of unknown yield score functions do not propagate during the transformation. Instead, they are typically reduced and bounded.

The data structures and code outlined in the foregoing description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent. Additionally, the above disclosure is not intended to limit the present invention. The scope of the present invention is defined by the appended claims.

TABLE 1A

| Rules | Specs (A) | Score |
|---|---|---|
| metal thickness vs. chip avg | >900 | 0 |
|  | >800 and <900 | 0.5 |
|  | >700 and <800 | 0.8 |
|  | <700 | 1 |
| metal thickness vs nbr gap | . . . | . . . |
| oxide thickness vs nbr gap | . . . | . . . |
| . . . | . . . | . . . |

TABLE 1B

| Rules | Specs | Weight | Score |
|---|---|---|---|
| Line-type NILS | <0.9 | must fix | 0 |
|  | >0.9 and <1.1 | 8 | 0.2 |
|  | >1.1 and <2 | 2 | 0.8 |
|  | >2 | 0 | 1 |
| Space-type NILS | . . . | . . . | . . . |
| . . . | . . . | . . . | . . . |

TABLE 2

|  |  | Our Approach | | "cdf" Approach | |
|---|---|---|---|---|---|
| $\sigma_{12}$ | Real Yield | $Y_{predict}$ | Err | $Y_{predict}$ | Err |
| 1 | 0.7738 | 0.7387 | 4.53% | 0.6844 | 11.55% |
| 0.81 | 0.7561 | 0.7246 | 4.17% | 0.6694 | 11.47% |
| 0.5 | 0.7198 | 0.6970 | 3.17% | 0.6405 | 11.02% |
| 0.3 | 0.6909 | 0.6759 | 2.17% | 0.6187 | 10.45% |
| 0 | 0.6394 | 0.6394 | 0 | 0.5816 | 9.04% |

TABLE 3

|  |  | Our Approach | | "cdf" Approach | |
|---|---|---|---|---|---|
| $\sigma_{12}$ | Real Yield | $Y_{predict}$ | Err | $Y_{predict}$ | Err |
| 1 | 0.8056 | 0.8296 | 2.98% | 0.7891 | 2.05% |
| 0.81 | 0.7957 | 0.8172 | 2.7% | 0.7753 | 2.56% |
| 0.5 | 0.7763 | 0.7917 | 1.98% | 0.7476 | 3.70% |
| 0.3 | 0.7615 | 0.7716 | 1.33% | 0.7262 | 4.64% |
| 0 | 0.7356 | 0.7356 | 0 | 0.6889 | 6.35% |

What is claimed is:

1. A method for predicting a manufacturing yield of a chip, comprising:
   using at least one computer for:
      receiving a chip layout;

identifying hotspots within the chip layout, wherein a hotspot is a location within the chip layout wherein a yield-indicative variable value falls in a low manufacturable range;

obtaining yield scores for the hotspots, wherein a yield score indicates a failure probability for a corresponding hotspot; and predicting the manufacturing yield for the chip based on the hotspots and the yield scores for the hotspots by:

applying a transformation T to each of the yield scores to obtain transformed yield scores which are independent of each other, wherein the transformation T decouples spatial correlations between the yield scores; and computing the manufacturing yield for the chip by multiplying individual transformed yield scores.

2. The method of claim 1, wherein identifying the hotspots within the chip layout involves:

receiving hotspot definitions, wherein the hotspot definitions specify ranges of the yield-indicative variable values which fall in a low manufacturable range;

performing a local process simulation on the chip layout to generate yield-indicative-variable values across the chip layout; and identifying the hotspots based on the generated yield-indicative-variable values and the hotspot definitions.

3. The method of claim 2, wherein the yield scores for the hotspots can be obtained by:

extracting the yield scores from measurement data; or performing a local process simulation.

4. The method of claim 1, wherein the yield score can be:

a number between 0 and 1; or normalized to a value between 0 and 1, wherein the yield score value is monotonic with the failure probability for a corresponding hotspot.

5. The method of claim 1, wherein the yield scores for the hotspots are spatially correlated with each other.

6. The method of claim 1, wherein the yield-indicative variable z is related to the yield score y at each hotspot by a yield score function $f$, such that $y=f(z)$.

7. The method of claim 6, wherein applying the transformation T to the yield scores to obtain transformed yield scores involves:

applying an inverse yield-score-function $f^{-1}$ to the yield scores to obtain original yield-indicative-variable values;

applying a linear transformation L to the original yield-indicative-variable values to obtain transformed yield-indicative-variable values which are independent of each other, wherein the linear transformation L decomposes spatial correlations between the original yield-indicative-variable values; and applying the yield-score-function $f$ to the transformed yield-indicative-variable values to obtain the transformed yield scores.

8. The method of claim 7, wherein the transformation T and the linear transformation L are related to each other such that $T(y)=f\{L[f^{-1}(y)]\}$.

9. The method of claim 7, wherein the yield score function $f$ is a nonlinear function of the yield-indicative variable.

10. The method of claim 7, further comprising obtaining the linear transformation L by:

obtaining a spatial-correlation matrix for yield-indicative-variable values associated with the hotspots, wherein the spatial-correlation matrix specifies the spatial correlations between yield-indicative-variable values; and obtaining the linear transformation L by deriving a linear transformation which is configured to decompose the spatial-correlation matrix.

11. The method of claim 7, wherein while applying the transformation T to the yield scores, the method further comprises:

using an approximated yield-score-function g for the yield-score-function $f$; and using an approximated inverse yield-score-function $g^{-1}$ for the inverse yield-score-function $f^{-1}$.

12. The method of claim 7, wherein the yield-indicative variable at each hotspot is associated with a distribution which is characterized by a mean and a variance; and wherein the yield-indicative variable can have distinct distributions at different hotspots.

13. The method of claim 12, wherein the yield score function $f$ is a function of:

the mean and the variance of the yield-indicative variable; and an upper and a lower manufacturing bounds.

14. The method of claim 13, further comprising:

centering the distributions of the yield-indicative variable at each of the hotspots to obtain zero-mean values for the distributions; and scaling the distributions of the yield-indicative variable at each of the hotspots to obtain unit-variance values for the distributions, whereby the upper and lower manufacturing bounds become functions of the original mean and variance of the corresponding distribution.

15. The method of claim 1, wherein the yield-indicative variable can include:

a thickness for a chemical mechanical polishing (CMP) process;

a critical dimension (CD) for a lithography process; and any other manufacturing process-related physical variables.

16. A computer-readable storage medium storing instructions that when executed by a computer cause the computer to perform a method for predicting a manufacturing yield of a chip, wherein the computer-readable storage medium does not include carrier waves, the method comprising:

receiving a chip layout;

identifying hotspots within the chip layout, wherein a hotspot is a location within the chip layout wherein a yield-indicative variable value falls in a low manufacturable range;

obtaining yield scores for the hotspots, wherein a yield score indicates a failure probability for a corresponding hotspot; and predicting the manufacturing yield for the chip based on the hotspots and the yield scores for the hotspots by:

applying a transformation T to each of the yield scores to obtain transformed yield scores which are independent of each other, wherein the transformation T decouples spatial correlations between the yield scores; and computing the manufacturing yield for the chip by multiplying individual transformed yield scores.

17. The computer-readable storage medium of claim 16, wherein identifying the hotspots within the chip layout involves:

receiving hotspot definitions, wherein the hotspot definitions specify ranges of the yield-indicative variable values which fall in a low manufacturable range;

performing a local process simulation on the chip layout to generate yield-indicative-variable values across the chip layout; and identifying the hotspots based on the generated yield-indicative-variable values and the hotspot definitions.

18. The computer-readable storage medium of claim 17, wherein the yield scores for the hotspots can be obtained by:
extracting the yield scores from measurement data; or
performing a local process simulation.

19. The computer-readable storage medium of claim 16, wherein the yield score can be:
a number between 0 and 1; or
normalized to a value between 0 and 1,
wherein the yield score value is monotonic with the failure probability for a corresponding hotspot.

20. The computer-readable storage medium of claim 16, wherein the yield scores for the hotspots are spatially correlated with each other.

21. The computer-readable storage medium of claim 16, wherein the yield-indicative variable z is related to the yield score y at each hotspot by a yield score function $f$, such that $y=f(z)$.

22. The computer-readable storage medium of claim 21, wherein applying the transformation T to the yield scores to obtain transformed yield scores involves:
applying an inverse yield-score-function $f^{-1}$ to the yield scores to obtain original yield-indicative-variable values;
applying a linear transformation L to the original yield-indicative-variable values to obtain transformed yield-indicative-variable values which are independent of each other, wherein the linear transformation L decomposes spatial correlations between the original yield-indicative-variable values; and
applying the yield-score-function $f$ to the transformed yield-indicative-variable values to obtain the transformed yield scores.

23. The computer-readable storage medium of claim 22, wherein the transformation T and the linear transformation L are related to each other such that $T(y)=f\{L[f^{-1}(y)]\}$.

24. The computer-readable storage medium of claim 22, wherein the yield score function $f$ is a nonlinear function of the yield-indicative variable.

25. The computer-readable storage medium of claim 22, further comprising obtaining the linear transformation L by:
obtaining a spatial-correlation matrix for yield-indicative-variable values associated with the hotspots, wherein the spatial-correlation matrix specifies the spatial correlations between yield-indicative-variable values; and
obtaining the linear transformation L by deriving a linear transformation which is configured to decompose the spatial-correlation matrix.

26. The computer-readable storage medium of claim 22, wherein while applying the transformation T to the yield scores, the method further comprises:

using an approximated yield-score-function g for the yield-score-function $f$; and
using an approximated inverse yield-score-function $g^{-1}$ for the inverse yield-score-function $f^{-1}$.

27. The computer-readable storage medium of claim 22, wherein the yield-indicative variable at each hotspot is associated with a distribution which is characterized by a mean and a variance; and
wherein the yield-indicative variable can have distinct distributions at different hotspots.

28. The computer-readable storage medium of claim 27, wherein the yield score function $f$ is a function of:
the mean and the variance of the yield-indicative variable; and
an upper and a lower manufacturing bounds.

29. The computer-readable storage medium of claim 28, further comprising:
centering the distributions of the yield-indicative variable at each of the hotspots to obtain zero-mean values for the distributions; and
scaling the distributions of the yield-indicative variable at each of the hotspots to obtain unit-variance values for the distributions,
whereby the upper and lower manufacturing bounds become functions of the original mean and variance of the corresponding distribution.

30. The computer-readable storage medium of claim 16, wherein the yield-indicative variable can include:
a thickness for a chemical mechanical polishing (CMP) process;
a critical dimension (CD) for a lithography process; and
any other manufacturing process-related physical variables.

31. An apparatus that predicts a manufacturing yield of a chip, comprising:
a receiving mechanism configured to receive a chip layout;
an identifying mechanism configured to identify hotspots within the chip layout, wherein a hotspot is a location within the chip layout wherein a yield-indicative variable value falls in a low manufacturable range;
an obtaining mechanism configured to obtain yield scores for the hotspots, wherein a yield score indicates a failure probability for a corresponding hotspot; and
a prediction mechanism configured to predict the manufacturing yield for the chip based on the hotspots and the yield scores for the hotspots by:
applying a transformation T to each of the yield scores to obtain transformed yield scores which are independent of each other, wherein the transformation T decouples spatial correlations between the yield scores; and
computing the manufacturing yield for the chip by multiplying individual transformed yield scores.

* * * * *